(12) United States Patent
Lin et al.

(10) Patent No.: US 12,033,435 B2
(45) Date of Patent: Jul. 9, 2024

(54) VISION-BASED MOTION CAPTURE SYSTEM FOR REHABILITATION TRAINING

(71) Applicant: TENCENT AMERICA LLC, Palo Alto, CA (US)

(72) Inventors: Shih-Yao Lin, Palo Alto, CA (US); Tao Yang, Mountain View, CA (US); Chao Huang, Palo Alto, CA (US); Zhen Qian, Santa Clara, CA (US); Wei Fan, New York, NY (US)

(73) Assignee: TENCENT AMERICA LLC, Palo Alto, CA (US)

( * ) Notice: Subject to any disclaimer, the term of this patent is extended or adjusted under 35 U.S.C. 154(b) by 521 days.

(21) Appl. No.: 17/307,533

(22) Filed: May 4, 2021

(65) Prior Publication Data
US 2022/0358309 A1    Nov. 10, 2022

(51) Int. Cl.
*G06T 7/246*    (2017.01)
*A63B 24/00*    (2006.01)
(Continued)

(52) U.S. Cl.
CPC .......... *G06V 40/23* (2022.01); *A63B 24/0062* (2013.01); *A63B 71/0622* (2013.01);
(Continued)

(58) Field of Classification Search
CPC ...... G06V 40/23; G06V 40/103; G06V 20/46; A63B 24/0062; A63B 71/0622;
(Continued)

(56) References Cited

U.S. PATENT DOCUMENTS

| 2011/0054870 A1* | 3/2011 | Dariush | G16H 50/50 348/46 |
| 2012/0327194 A1* | 12/2012 | Shiratori | G06F 3/011 348/47 |

(Continued)

FOREIGN PATENT DOCUMENTS

| CN | 109934111 A | * | 6/2019 |
| DE | 102019120655 A1 | * | 2/2021 |

(Continued)

OTHER PUBLICATIONS

Liao, Yalin, Aleksandar Vakanski, and Min Xian. "A deep learning framework for assessing physical rehabilitation exercises." IEEE Transactions on Neural Systems and Rehabilitation Engineering 28, No. 2 (2020): 468-477. (Year: 2020).*

(Continued)

*Primary Examiner* — Carol Wang
(74) *Attorney, Agent, or Firm* — Sughrue Mion, PLLC

(57) ABSTRACT

There is included a method and apparatus comprising computer code configured to cause a processor or processors to perform obtaining video data including at least one body part of a person, selecting keypoints of the at least one body part based on a predetermined rehabilitation category, extracting a motion feature of the at least one body part from the video data, scoring the motion feature based on the predetermined rehabilitation category, and generating a display illustrating the motion feature and said scoring of the motion feature.

16 Claims, 11 Drawing Sheets

(51) Int. Cl.
*A63B 71/06* (2006.01)
*G06N 3/04* (2023.01)
*G06V 20/40* (2022.01)
*G06V 40/10* (2022.01)
*G06V 40/20* (2022.01)

(52) U.S. Cl.
CPC .......... *A63B 71/0669* (2013.01); *G06N 3/04* (2013.01); *G06T 7/251* (2017.01); *G06V 20/46* (2022.01); *G06V 40/103* (2022.01); *A63B 2071/0636* (2013.01)

(58) Field of Classification Search
CPC ........ A63B 71/0669; A63B 2071/0636; G06N 3/04; G06N 3/0464; G06T 7/251; G06T 2207/10016; G06T 2207/20084; G06T 2207/30196
See application file for complete search history.

(56) References Cited

U.S. PATENT DOCUMENTS

| | | | |
|---|---|---|---|
| 2014/0228985 A1 | 8/2014 | Elliott et al. | |
| 2015/0003687 A1* | 1/2015 | Utsunomiya | G06V 40/25 382/107 |
| 2018/0107893 A1 | 4/2018 | Andreopoulos et al. | |
| 2019/0171871 A1* | 6/2019 | Zhang | G06V 40/103 |
| 2019/0295436 A1* | 9/2019 | Rubinstein | A63B 24/0062 |
| 2019/0303720 A1 | 10/2019 | Karam et al. | |
| 2019/0362139 A1* | 11/2019 | Mehl | A61B 5/1118 |
| 2019/0362506 A1* | 11/2019 | Leroyer | G09B 19/0038 |
| 2020/0005670 A1* | 1/2020 | Iwao | G06T 7/246 |
| 2020/0085348 A1 | 3/2020 | Lillie et al. | |
| 2021/0008413 A1* | 1/2021 | Asikainen | G06F 3/0304 |
| 2021/0346761 A1* | 11/2021 | Sterling | G06V 20/46 |
| 2022/0036052 A1* | 2/2022 | Prince | G06V 20/46 |
| 2022/0262010 A1* | 8/2022 | Shpuza | G06V 20/46 |

FOREIGN PATENT DOCUMENTS

| | | | |
|---|---|---|---|
| EP | 3786971 A1 * | 3/2021 | ......... A63B 24/0003 |
| KR | 102049096 B1 * | 11/2019 | |

OTHER PUBLICATIONS

Ren, Shaoqing, Kaiming He, Ross Girshick, and Jian Sun. "Faster r-cnn: Towards real-time object detection with region proposal networks." Advances in neural information processing systems 28 (2015). (Year: 2015).*

Lifshitz, Ita, Ethan Fetaya, and Shimon Ullman. "Human pose estimation using deep consensus voting." In Computer Vision—ECCV 2016: 14th European Conference, Amsterdam, The Netherlands, Oct. 11-14, 2016, Proceedings, Part II 14, pp. 246-260. Springer International Publishing, 2016. (Year: 2016).*

KR 102049096 Translation (Year: 2019).*

Fang, Hao-Shu, Jinkun Cao, Yu-Wing Tai, and Cewu Lu. "Pairwise body-part attention for recognizing human-object interactions." In Proceedings of the European conference on computer vision (ECCV), pp. 51-67. 2018. (Year: 2018).*

Li, Yang, Kan Li, and Xinxin Wang. "Recognizing actions in images by fusing multiple body structure cues." Pattern Recognition 104 (2020): 107341. (Year: 2020).*

International Search Report issued Mar. 3, 2022 in International Application No. PCT/US2021/063789.

Written Opinion of the International Searching Authority issued Mar. 3, 2022 in International Application No. PCT/US2021/063789.

* cited by examiner

VISION-BASED MOTION CAPTURE SYSTEM FOR REHABILITATION TRAINING

BACKGROUND

1. Field

The present disclosure is directed to technical solutions with respect to vision-based motion capture system (VMCS) for rehabilitation training.

2. Description of Related Art

A physiotherapist may offer physical rehabilitation, such as for patients, including the elderly, suffering from motor dysfunction-related diseases and/or injuries. However, such rehabilitation training requires direct supervision by a professional physiotherapist, and when patients are performing rehabilitation exercises there is also a need for continuation guidance by a rehabilitation specialist. As such, the training and exercising requires arduous monitoring and attention of such patients by those professionals and specialists which requires substantial time and effort in assisting the rehabilitation efforts. Additionally, even without the professionals and specialists, it is expected that patients training themselves, such as at home rather than in a clinic, will lack the specialized rehabilitation experience and guidance offered by the physiotherapist which will therefore lead to poor rehabilitation performance and even cause further physical injuries.

Attempting to automate assessment systems, such as by sensor-based approaches (e.g., wearable, infrared cameras), is complicated to use, expensive, and inadequately scalable. For example, such sensor-based motion capture system (SMCS) is technically inadequate, in at least requiring specific hardware, specialized programing to obtain an process data, complicated requirements to capture human body motion, high costs therewith such software and hardware, thereby limiting practical application with respect to rehabilitation training.

SUMMARY

There is included a method and apparatus comprising memory configured to store computer program code and a processor or processors configured to access the computer program code and operate as instructed by the computer program code. The computer program code includes obtaining code configured to cause the at least one processor to obtain video data including at least one body part of a person, selecting code configured to cause the at least one processor to select keypoints of the at least one body part based on a predetermined rehabilitation category, extracting code configured to cause the at least one processor to extract a motion feature of the at least one body part from the video data, scoring code configured to cause the at least one processor to score the motion feature based on the predetermined rehabilitation category, and generating code configured to cause the at least one processor to generate a display illustrating the motion feature and said scoring of the motion feature.

According to exemplary embodiments, said scoring the motion feature of the at least one body part from the video data comprises determining at least one of a keypoint distance and an angle, the keypoint distance comprises a Euclidean distance between a plurality of keypoints of the at least one body part of the person, and the angle comprises an angle between portions of the at least one body part of the person.

According to exemplary embodiments, the computer code further includes scaling code configured to cause the at least one processor to scale the at least one body part of the person to a predetermined size based on a height of the person, and said scoring of the motion feature based on the predetermined rehabilitation category comprises said scoring after said scaling of the at least one body part of the person.

According to exemplary embodiments, the computer code further includes application code configured to cause the at least one processor to apply one or more Gaussian filters to the motion feature.

According to exemplary embodiments, said generating the display illustrating the motion feature and said scoring of the motion feature comprises plotting the motion feature in the video.

According to exemplary embodiments, wherein said selecting the keypoints of the at least one body part based on the predetermined rehabilitation category comprises predicting the predetermined rehabilitation category by a deep neural network (DNN) configured to predict N possible regions representing possible locations of the keypoints with respect to the at least one body part, and N is an integer.

According to exemplary embodiments, said predicting the predetermined rehabilitation category by the DNN comprises comparing the video data including at least one body part of a person to a plurality of anchor poses, and the plurality of anchor poses each comprise poses of ones of predetermined rehabilitation categories, including the predetermined rehabilitation category.

According to exemplary embodiments, said predicting the predetermined rehabilitation category by the DNN comprises ranking N*K pose regions, and K is an integer indicating a number of predetermined keypoints of a human body.

According to exemplary embodiments, said generating the display illustrating the motion feature and said scoring of the motion feature comprises generating the display such that at least one of the anchor poses is illustrated as overlayed on the at least one body part of the person According to exemplary embodiments, wherein the video data of the at least one body part of the person comprises an red-green-blue (RGB) image of the at least one body part of the person obtained by a monocular camera.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
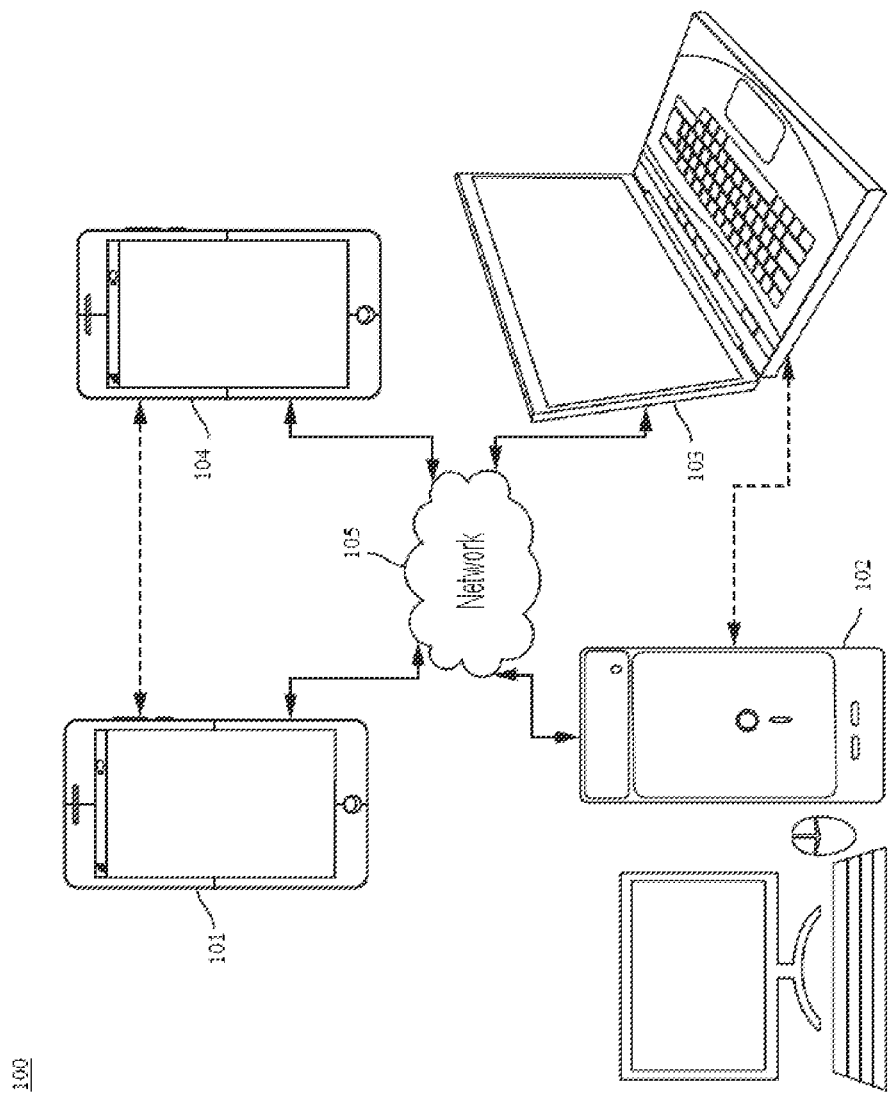
FIG. 1 is a simplified illustration of a schematic diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
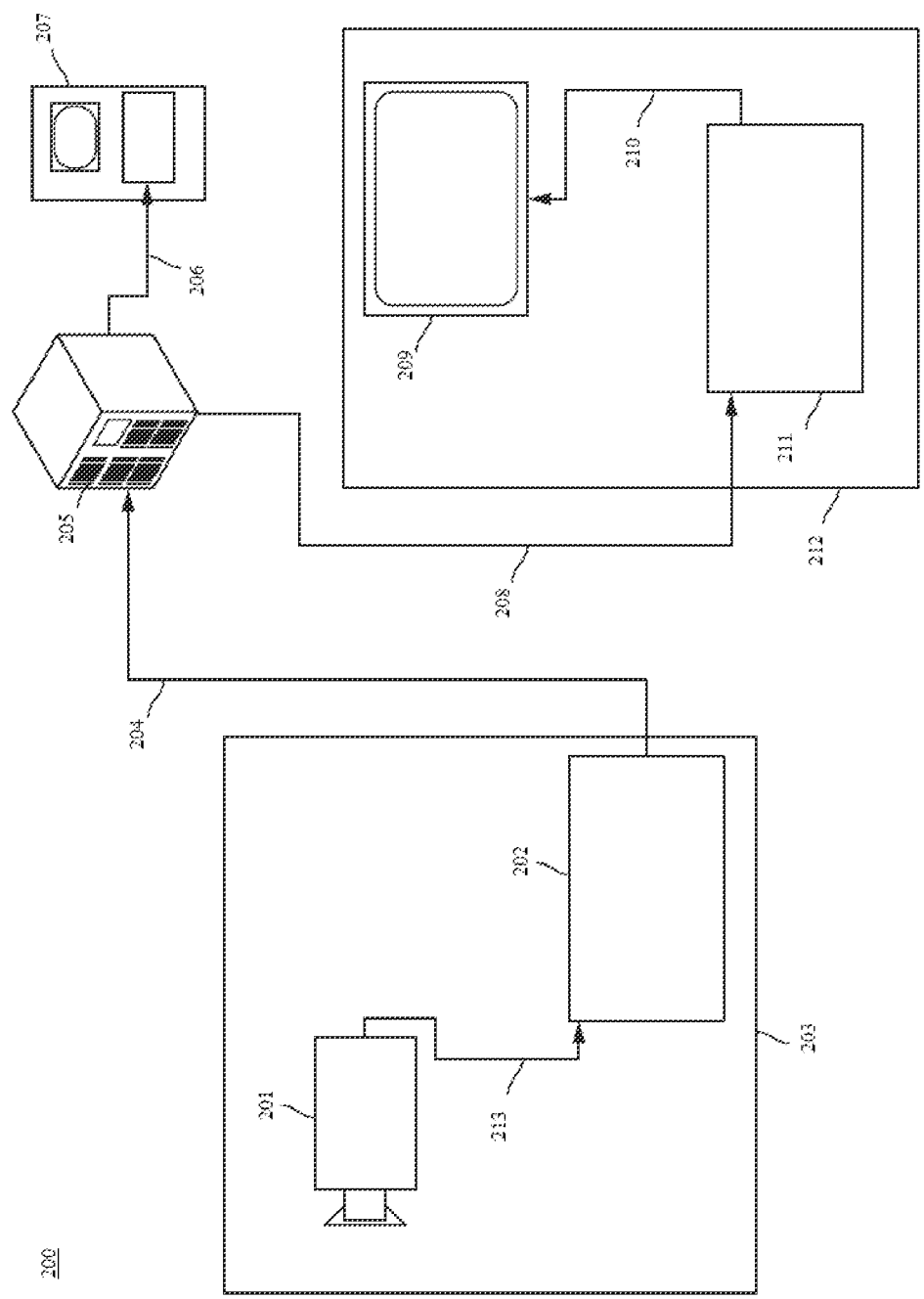
FIG. 2 is a simplified illustration of a schematic diagram in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
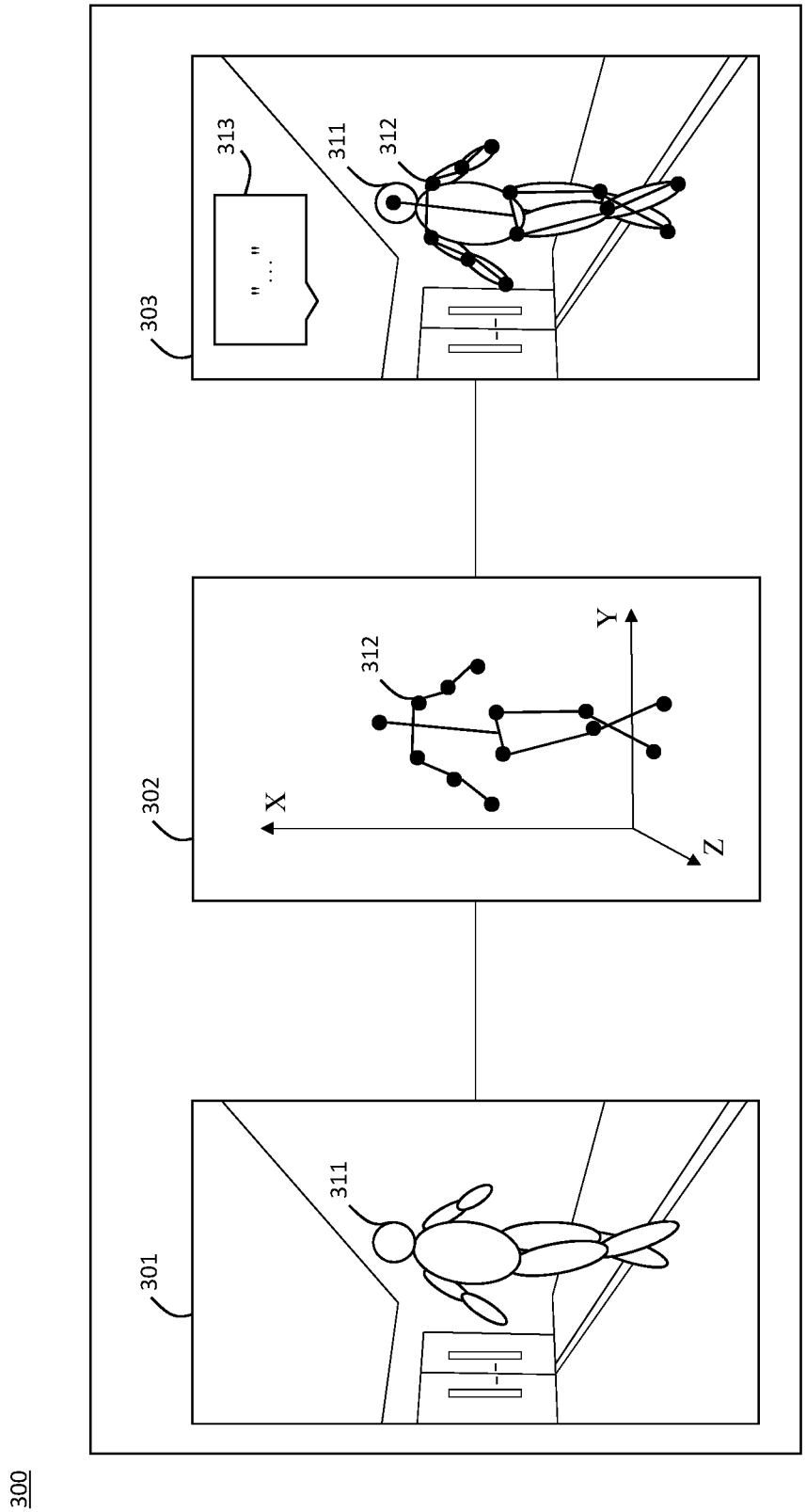
FIG. 3 is a simplified illustration of a diagram in accordance with embodiments.

FIG. 3 illustrates an example diagram 300 in which there is an image 301 from a video captured by at least a monocular camera, such as of a smartphone described herein, wherein such image 301 is a person 311. Exemplary embodiments herein are configured to identify various joints of a model 312, shown in layer image 302, of the person 311 and may superimpose that model 312, which may be considered a keypoint estimation, onto the person 311 as shown in an image 303 which may also include comment 313 such as suggested physiotherapeutic adjustments as described herein. The image 303 may also be an image that is output to a smartphone noted above so as to provide comments and analysis to a patient, and the specific illustrations are subject to various modifications rather than the specific example shown herein.

Figure 4:
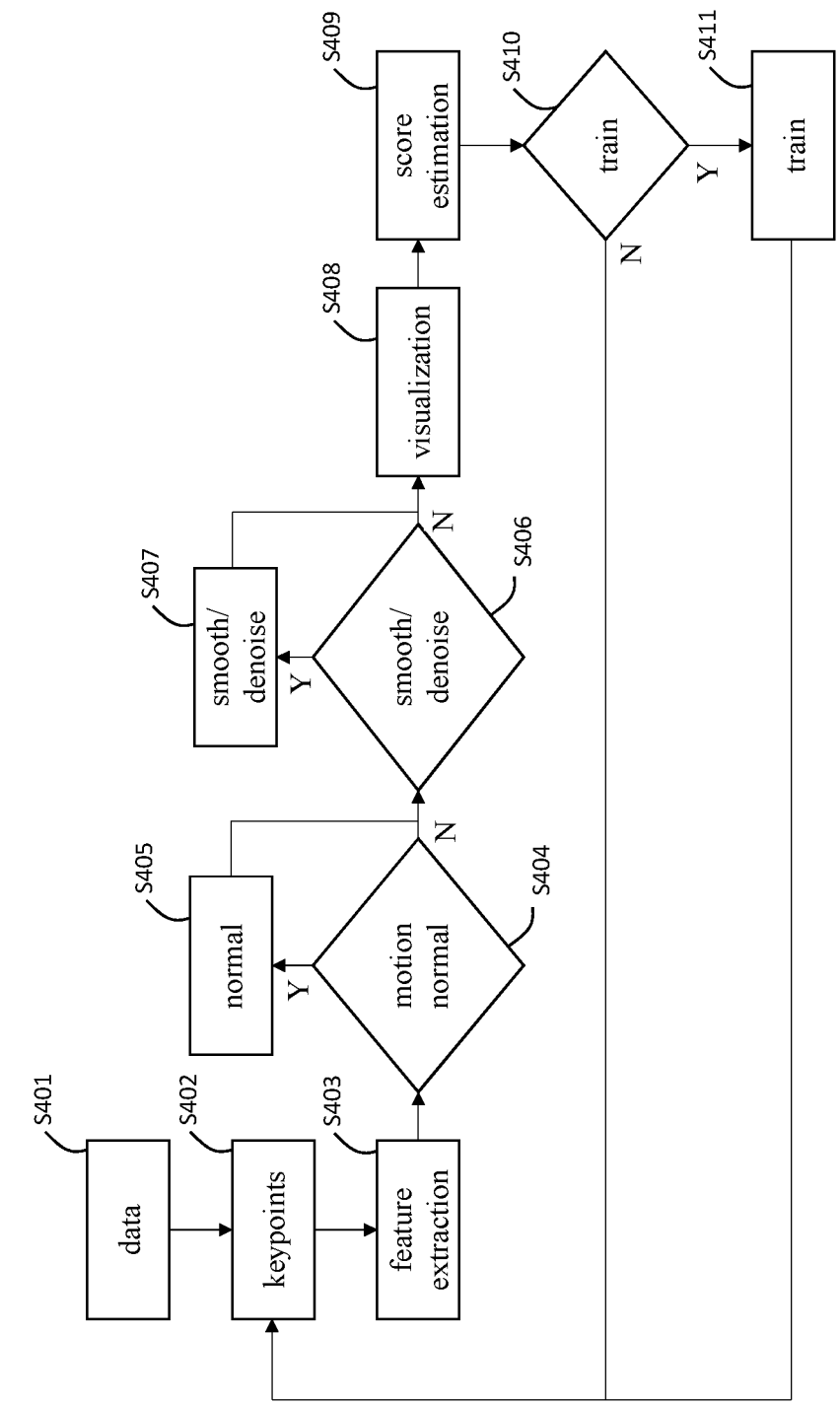
FIG. 4 is a simplified illustration of a flow diagram in accordance with embodiments.

FIG. 4 illustrates an exemplary flowchart 400 in which at S401, data may be received. According to exemplary embodiments, such flowchart 400 may represent any of different scenarios such as with respect to a scenario at a rehabilitation room/clinic and a scenario at a patients home/otherwise out of such clinic. In the rehabilitation room scenario, the physiotherapist may have asked the patients to perform the rehabilitation actions, whereafter the data may be obtained with respect to a camera recording of the patient's rehabilitation actions, such as by using the camera of their cellphone. Those recorded videos, data of S401, may then be uploaded to a server, such as a cloud server and/or a doctor's-office computer for evaluation, e.g., described below S402-S411, of a correctness of the patients' motions in such server and/or computer. After the evaluation process, our system sends the evaluation results to the physiotherapist, such as with the comments 313 described above, thereby aiding an otherwise impractical analysis and diagnosis of the patient's recovery status by the physiotherapist. According to embodiments in the home scenario, the patients may use a camera of their cellphones to record their rehabilitation actions, where after evaluating the correctness of their rehabilitation actions, such cloud servers may directly provide a performance score and rehabilitation advice to the patients.

For example, in such motion curve generation pipeline, there is analysis of input of a series of 3D body keypoints and visualization thereof as follows. For example, at S402, there is 3D human body keypoint estimation such that a human body keypoint detection module of such cloud server aims to capture a 3D position of body joint from an input RGB image, such as the image 301 and/or the image 501 in the example diagram 500 of FIG. 5. The image 302 in FIG. 3 an estimated human pose represented by a set of 3D keypoints 312. Additionally, there is a keypoint selection at S402 wherein specific keypoints may be selected according to a rehabilitation action category, such as for example, only the keypoints on the hands for hand rehabilitation action may be selected such as in the selection 523 in image 502 of FIG. 5.

Figure 6:
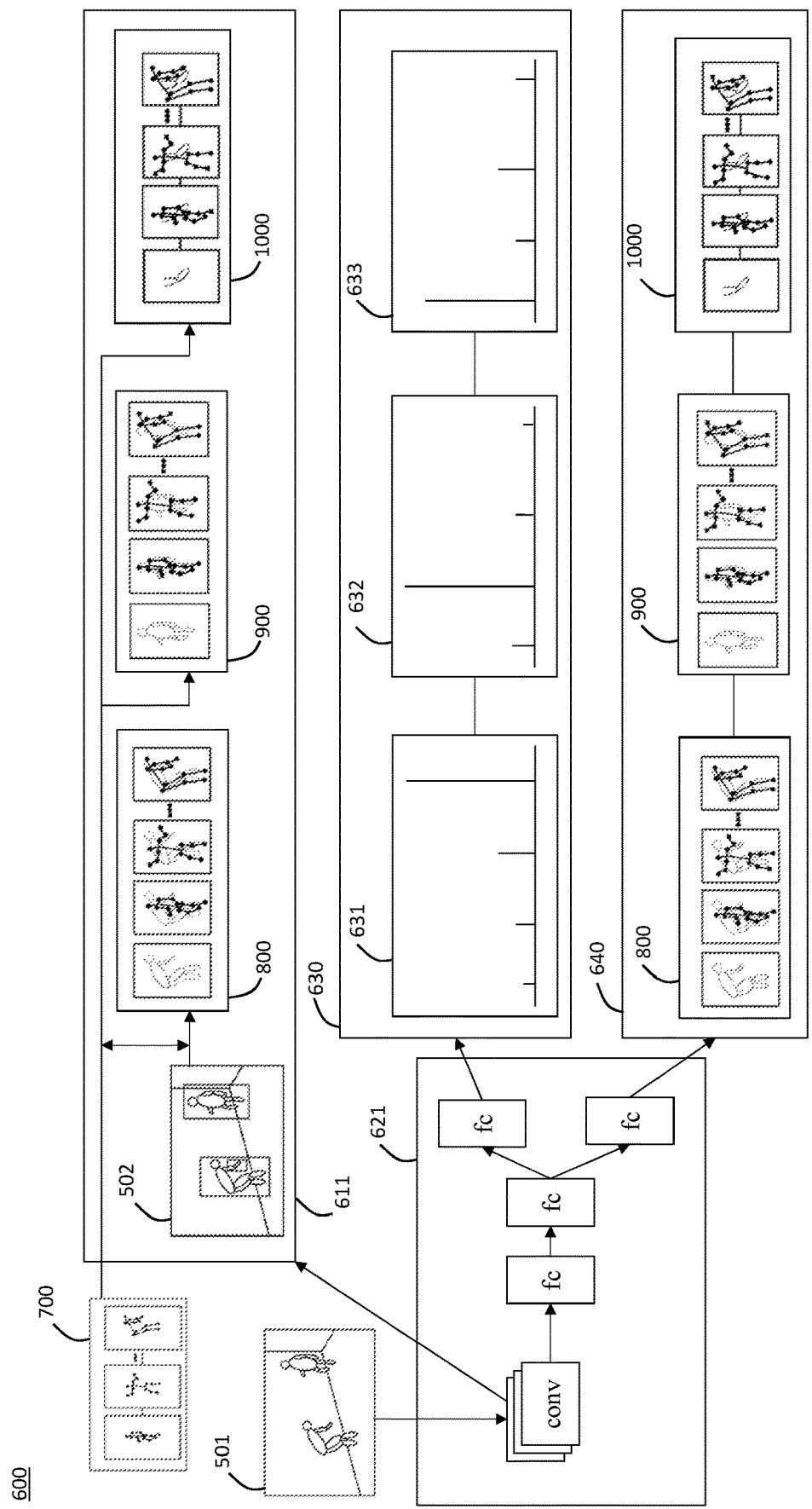
FIG. 6 is a simplified illustration of a diagram in accordance with embodiments.

Such 3D human pose can be estimated with a deep neural network such as but not limited to the exemplary network architecture 600 shown in FIG. 6. As in FIG. 6, network architecture 600 includes at least two modules, a region proposal module 611 and a combination of modules 630 and 640 as a pose fine-tuning module. The region proposal module 611 may be used to predict possible regions of each body keypoint. Exemplary embodiments leverage a pose proposal network to predict N possible regions to represent the possible location of each body keypoint, and assuming a human body pose consists of K body keypoints, such exemplary region proposal network will output N*K pose regions. Further, such pose fine-tuning module, modules 630 (classification) and 640 (regression), is used to rank the pose proposal with a classifier and a regressor and output the final pose estimation results as described herein.

For example, at S403, there may be motion feature extraction whereby there is implemented extraction of one or more motion features based on a rehabilitation motion category. Embodiments provide two motion feature extractors including a keypoint distance extractor and a keypoint angle extractor. For the keypoint distance extractor, there is calculation of a Euclidean distance between the two specific keypoints. For the angle extractor, there is calculation of an angle between two limbs such as between upper and lower portions of an arm separated with an elbow therebetween. Such calculations occur with respect to the neural network and the input image, such as from a smartphone.

At S404 it may be determined whether motion feature normalization is preset to be implemented, and such determination may also include determining whether there are different shooting conditions of the video from a preset condition(s) such that a motion feature normalization is needed for motion feature analysis. If so, then at S405, normalization may occur such that the patient's scale and position are normalized such that the patient body is scaled to a fixed size based on the patient's height.

At S406, it may be determined whether any of feature smoothing and denoising is preset to be implemented, for example, due to possible false pose estimation, some estimated 3D keypoints in the video might be inaccurate, which would cause the estimated motion feature not smooth. As such, if such smoothing and denoising is to be implemented, then at S407, the feature smoothing and denoising process may employ Gaussian filters to the smooth the motion feature.

At S407, there is motion curve visualization whereby the patient's analyzed motion may be visualized by a plot of all motion features in the input video, and at S408, there is a performance score estimation, such as provision of a performance score estimator as a deep neural network (DNN) classifier, and such performance score estimator may be trained at S411, if so determined at S410, with the estimated motion curves. Exemplary embodiments include a score range for performance score estimators of {0, 1, 2, 3, 4}.

As such, there are technical improvements to technical problems with respect to physiotherapy such that impractical constraints on physiotherapy guidance may be avoided by embodiments herein. For example, a goal of the described motion curve generation process may be to visualize the motion trajectory of the patient in an input video, and estimated motion curves improve practicability of any of a physiotherapist in monitoring a patients' recovery status. Also, said motion curves can be used to train a performance score estimator, and given a patient's motion video, embodiments herein can advantageously estimate a 3D human pose (3D body keypoints) from each frame of input video, and a pipeline including motion curve generation process is shown illustrated with respect to FIGS. 4 and 6.

Figure 5:
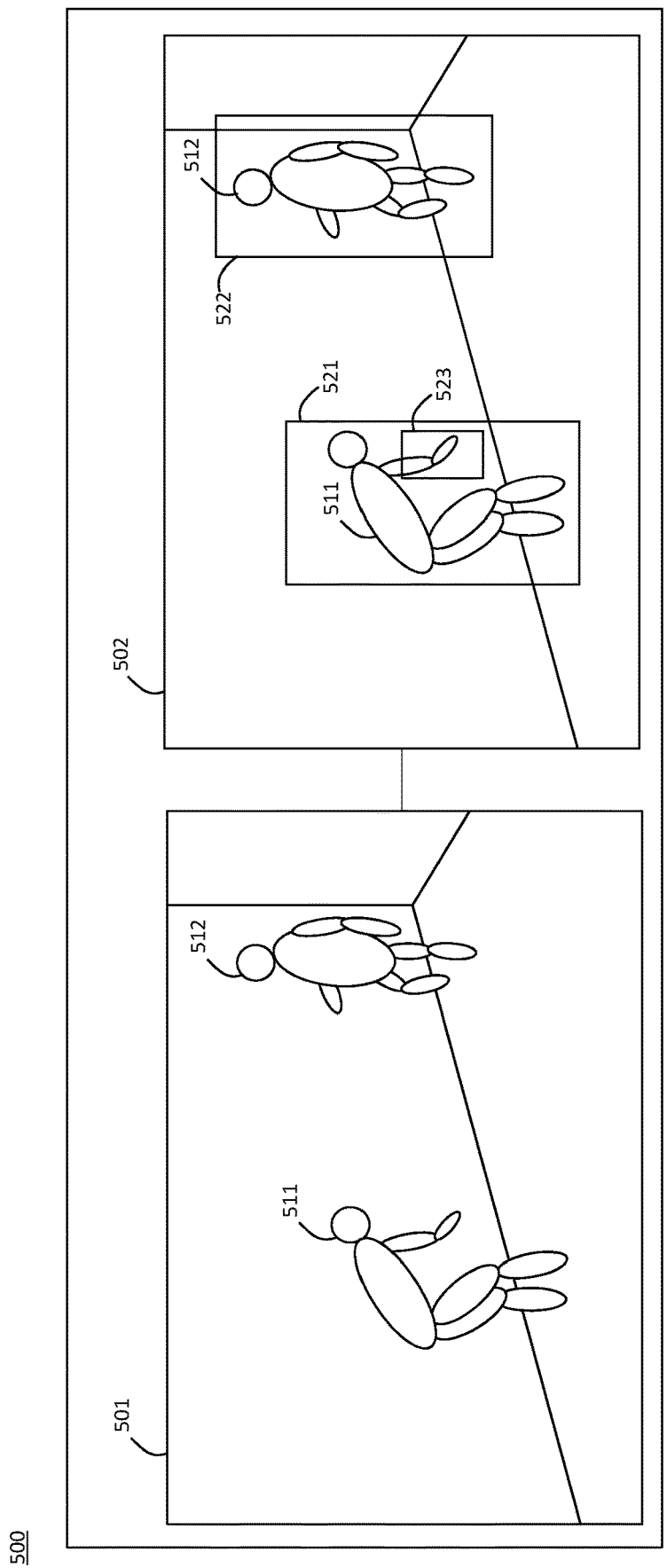
FIG. 5 is a simplified illustration of a diagram in accordance with embodiments.

According to exemplary embodiments, FIG. 5 illustrates an example 500 in which an image 501 from a camera, such as of a smartphone taking a video, is illustrated and includes a person 511 and a person 512. According to exemplary embodiments, at S402, selections 521, 522, and 522 may be made wherein selection 521 is of the whole person 511, selection 522 is of the whole person 512, and as explained above, as only some portions of a person may be analyzed specifically, selection 523 is of such portion of the person 511 for example.

Figure 7:
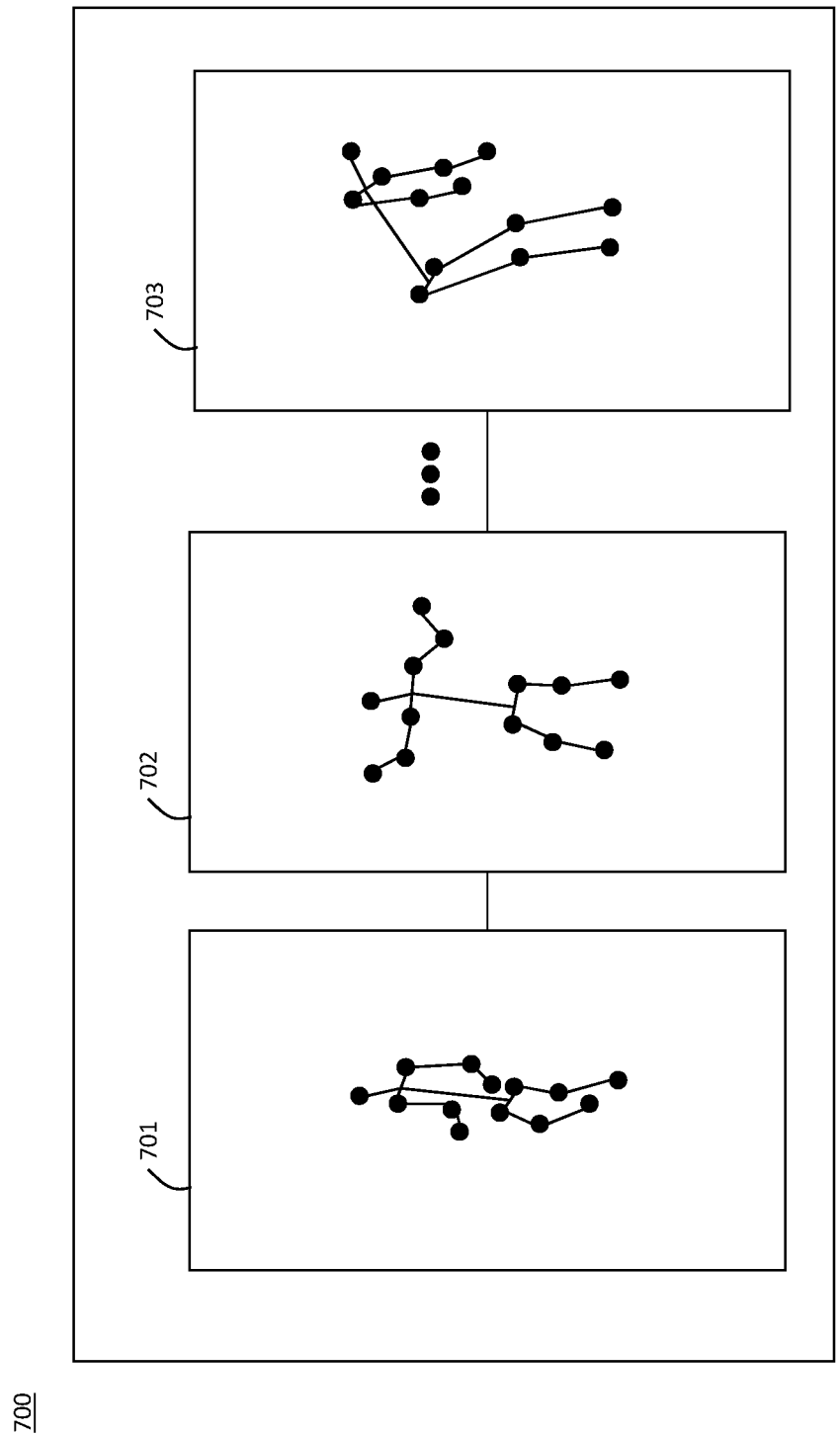
FIG. 7 is a simplified illustration of a diagram in accordance with embodiments.
Figure 8:
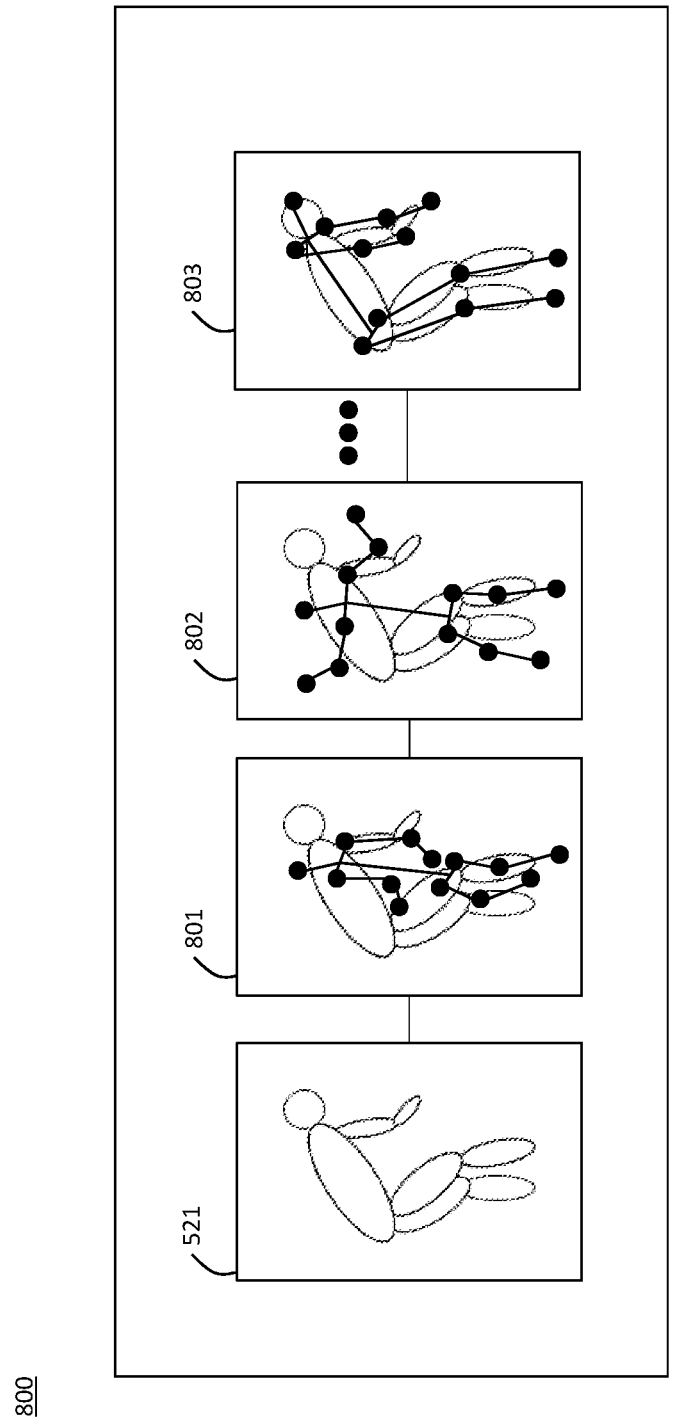
FIG. 8 is a simplified illustration of a diagram in accordance with embodiments.
Figure 9:
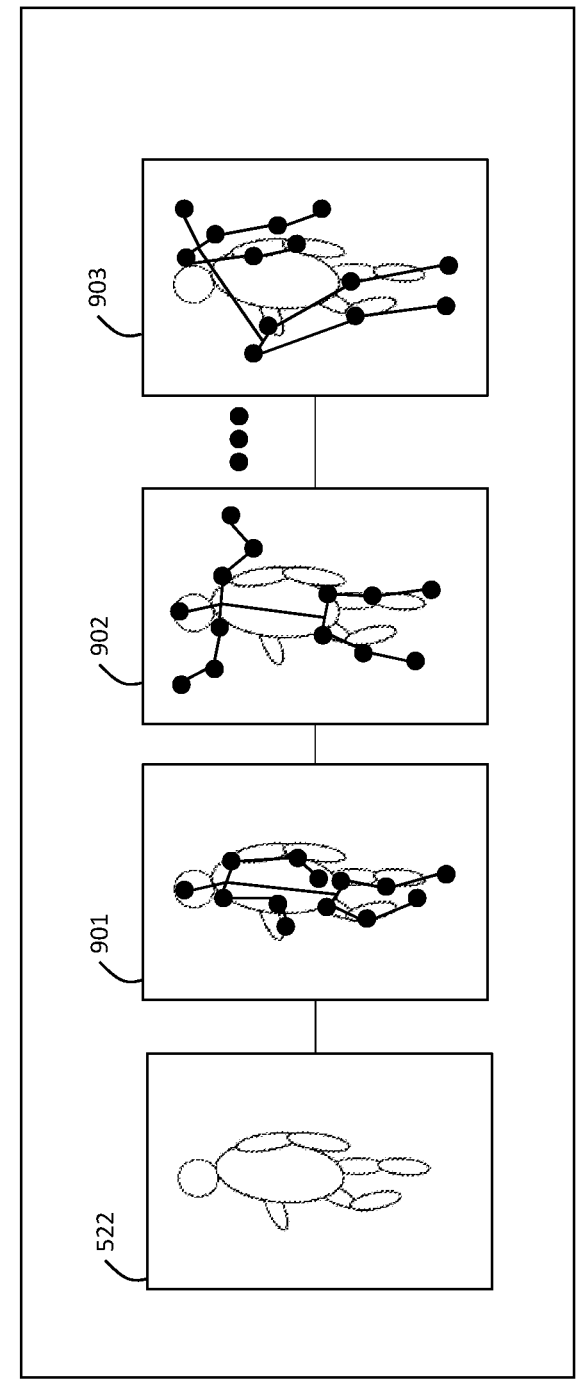
FIG. 9 is a simplified illustration of a diagram in accordance with embodiments.
Figure 10:
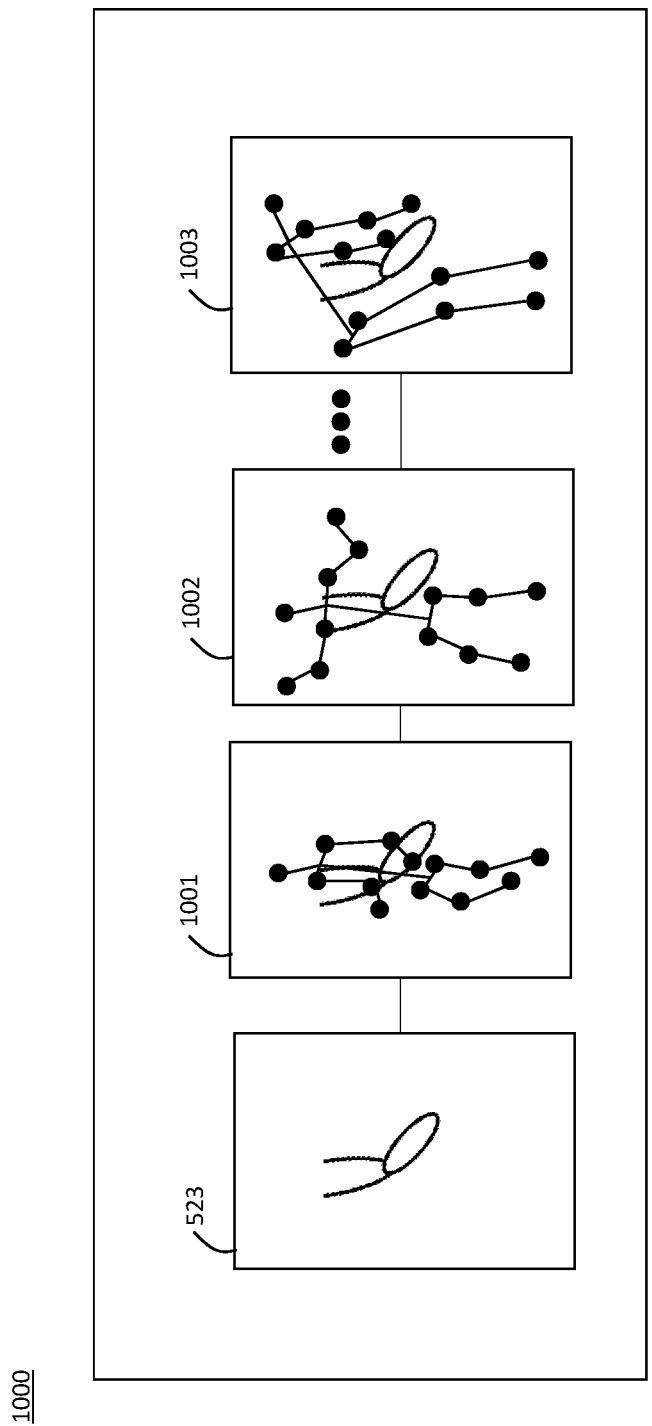
FIG. 10 is a simplified illustration of a diagram in accordance with embodiments.

Viewing FIG. 7, there is a diagram 700 of exemplary poses 701, 702, and 703, anchor-poses, and other poses may also be included. Such anchor-poses may be analyzed with respect to any provided images and selections therefrom. For example, as in the features 800 in FIG. 8 illustrate that the selection 521, from FIG. 5, may be analyzed with respect to the poses 701, 702, and 703, respectively at blocks 801, 802, and 803. Similarly, as in the features 900 in FIG. 9 illustrate that the selection 522, from FIG. 5, may be analyzed with respect to the poses 701, 702, and 703, respectively at blocks 901, 902, and 903. Also, as in the features 1000 in FIG. 10 illustrate that the selection 523, from FIG. 5, may be analyzed with respect to the poses 701, 702, and 703, respectively at blocks 1001, 1002, and 1003.

Viewing the network architecture 600 in FIG. 6, the image 501 from FIG. 5 may be input data to the simplified network block 621 which may provide features with respect to the a region proposal module 611 (localization) and a combination of modules 630 (classification) and 640 (regression) as a pose fine-tuning module. For example, as shown in FIG. 6, the poses 700 are fed into the selections from the image 502 as the features 800, 900, and 1000 which correspond to the features of FIGS. 8, 9, and 10 respectively.

Accordingly, an RGB image may be used to determine estimates of a 3D human body keypoint with estimated 3d human body joints. Core functions of exemplary embodiments in VMCS includes such three main modules, human body keypoint estimation, motion curve generation, and performance score estimation. Accordingly, exemplary embodiments advantageously leverage a single camera of a mobile device to capture 3D human body motion, and by VMCS application to various rehabilitation actions greatly alleviates inconveniences of existing SMCS, lower the equipment cost, and improve practicality of physiotherapy by health care experts. For example, a goal of said motion curve generation process is to visualize the motion trajectory of a patient in the input video, and the estimated motion curves can help the physiotherapist to monitor the patients' recovery status. Further, besides, the motion curves can be used to train a performance score estimator such that given a patient's motion video exemplary embodiments advantageously estimate 3D human pose (3D body keypoints) from each frame of the input video such as described with respect to FIGS. 4 and 6.

Additionally, with respect to the module 640, those features 800, 900, and 1000 may be analyzed to produce data such as the charts 631, 632, and 633 of module 630. For example, classification chart 631 indicates that, with respect to features 800, pose 803 is most accurate to the pose of person 511 from FIG. 5. Similarly, classification chart 632 indicates that, with respect to features 900, pose 901 is most accurate to the pose of person 512 from FIG. 5. Also, classification chart 633 indicates that, with respect to features 1000, that none of the anchor-poses 700 accurately reflect the pose of selection 523.

Embodiments represent significant technological improvements as to a vision-based motion capture system for rehabilitation training such that the system can rely only on a single camera in any mobile device, which has greatly improved the usability comparing to the traditional sensor-based motion capture system, and as such, the patients who are with motor dysfunction diseases can be diagnosed and rehabilitated with more practicability.

As such, according to exemplary embodiments, there is a vision-based motion capture system for rehabilitation training relying on only a single camera in any mobile device, which has greatly improved the usability comparing to the traditional sensor-based motion capture system, and as such, with embodiments herein, the patients who are with motor dysfunction diseases can be diagnosed and rehabilitated more practically by such VMCS with a monocular camera for rehabilitation training.

As described herein, there may be one or more hardware processor and computer components, such as buffers, arithmetic logic units, memory instructions, configured to determine or store predetermined delta values (differences) between ones of the values described herein according to exemplary embodiments.

The techniques described above, can be implemented as computer software using computer-readable instructions and physically stored in one or more computer-readable media or by a specifically configured one or more hardware processors. For example, FIG. 11 shows a computer system 1100 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
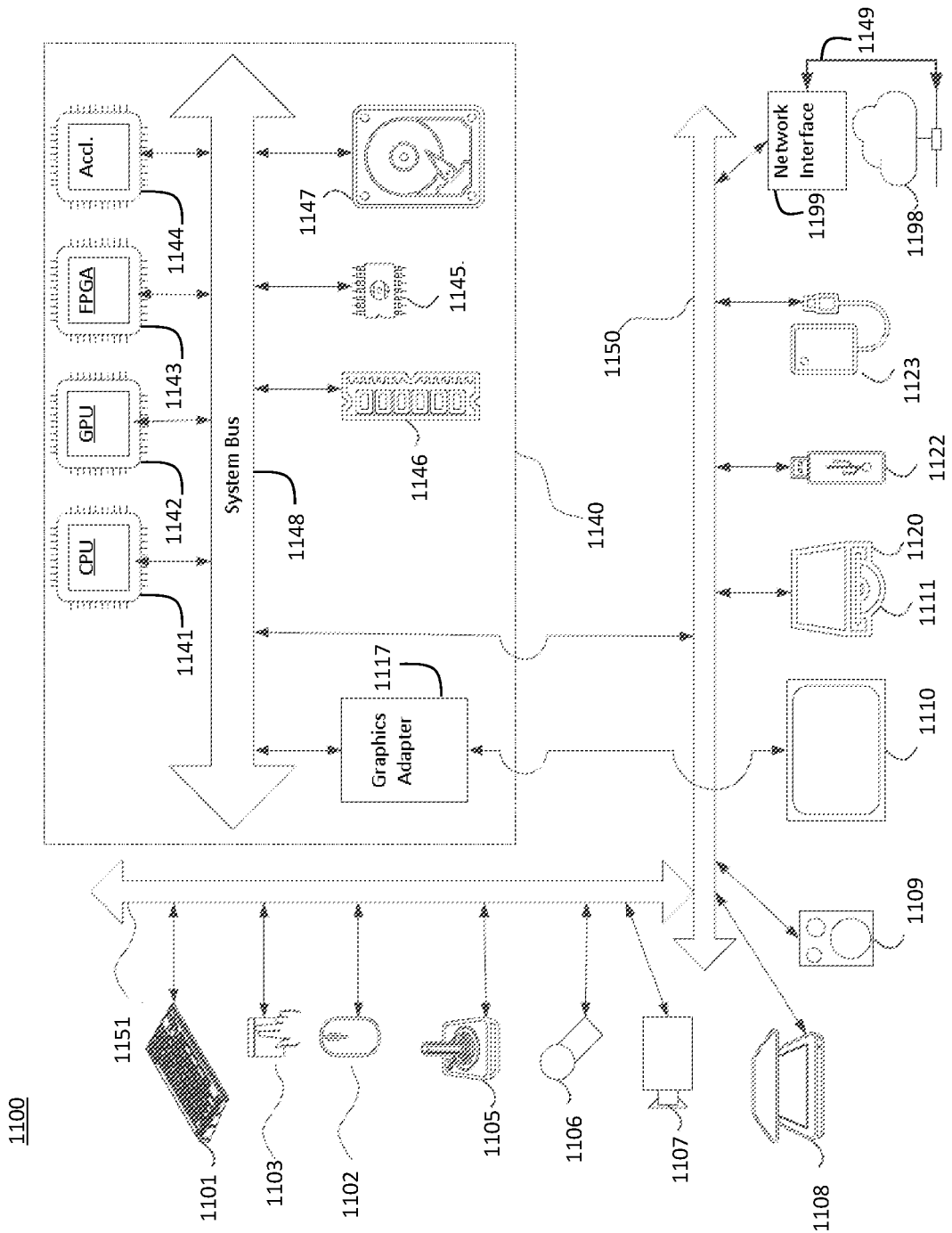
FIG. 11 a simplified illustration of a flowchart in accordance with embodiments.

The components shown in FIG. 11 for computer system 1100 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1100.

Computer system 1100 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1101, mouse 1102, trackpad 1103, touch screen 1110, joystick 1105, microphone 1106, scanner 1108, camera 1107.

Computer system 1100 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1110, or joystick 1105, but there can also be tactile feedback devices that do not serve as input devices), audio output devices (such as: speakers 1109, headphones (not depicted)), visual output devices (such as screens 1110 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1100 can also include human accessible storage devices and their associated media such as optical media including CD/DVD ROM/RW 1120 with CD/DVD 1111 or the like media, thumb-drive 1122, removable hard drive or solid state drive 1123, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1100 can also include interface 1199 to one or more communication networks 1198. Networks 1198 can for example be wireless, wireline, optical. Networks 1198 can further be local, wide-area, metropolitan, vehicular and industrial, real-time, delay-tolerant, and so on. Examples of networks 1198 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1198 commonly require external network interface adapters that attached to certain general-purpose data ports or peripheral buses (1150 and 1151) (such as, for example USB ports of the computer system 1100; others are commonly integrated into the core of the computer system 1100 by attachment to a system bus as described below (for example Ethernet interface into a PC computer system or cellular network interface into a smartphone computer system). Using any of these networks 1198, computer system 1100 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1140 of the computer system 1100.

The core 1140 can include one or more Central Processing Units (CPU) 1141, Graphics Processing Units (GPU) 1142, a graphics adapter 1117, specialized programmable processing units in the form of Field Programmable Gate Areas (FPGA) 1143, hardware accelerators for certain tasks 1144, and so forth. These devices, along with Read-only memory (ROM) 1145, Random-access memory 1146, internal mass storage such as internal non-user accessible hard drives, SSDs, and the like 1147, may be connected through a system bus 1148. In some computer systems, the system bus 1148 can be accessible in the form of one or more physical plugs to enable extensions by additional CPUs, GPU, and the like. The peripheral devices can be attached either directly to the core's system bus 1148, or through a peripheral bus 1151. Architectures for a peripheral bus include PCI, USB, and the like.

CPUs 1141, GPUs 1142, FPGAs 1143, and accelerators 1144 can execute certain instructions that, in combination, can make up the aforementioned computer code. That computer code can be stored in ROM 1145 or RAM 1146. Transitional data can be also be stored in RAM 1146, whereas permanent data can be stored for example, in the internal mass storage 1147. Fast storage and retrieval to any of the memory devices can be enabled through the use of cache memory, that can be closely associated with one or more CPU 1141, GPU 1142, mass storage 1147, ROM 1145, RAM 1146, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1100, and specifically the core 1140 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1140 that are of non-transitory nature, such as core-internal mass storage 1147 or ROM 1145. The software implementing various embodiments of the present disclosure can be stored in such devices and executed by core 1140. A computer-readable medium can include one or more memory devices or chips, according to particular needs. The software can cause the core 1140 and specifically the processors therein (including CPU, GPU, FPGA, and the like) to execute particular processes or particular parts of particular processes described herein, including defining data structures stored in RAM 1146 and modifying such data structures according to the processes defined by the software. In addition or as an alternative, the computer system can provide functionality as a result of logic hardwired or otherwise embodied in a circuit (for example: accelerator 1144), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video-based motion capture performed by at least one processor, the method comprising:
    obtaining, from a monocular camera of a smartphone, video data including at least one body part of a person, the video data being spatially only two-dimensional;
    selecting keypoints of the at least one body part based on a predetermined rehabilitation category;
    extracting a motion feature of the at least one body part from the video data;
    scoring the motion feature based on the predetermined rehabilitation category; and
    generating a display illustrating the motion feature and said scoring of the motion feature,
    wherein said selecting the keypoints of the at least one body part based on the predetermined rehabilitation category comprises predicting the predetermined rehabilitation category by a deep neural network (DNN) configured to predict N possible regions representing possible locations of the keypoints with respect to the at least one body part,
    wherein N is an integer,
    wherein said predicting the predetermined rehabilitation category by the DNN comprises comparing the video data including at least one body part of the person to a plurality of anchor poses, and
    wherein the plurality of anchor poses each comprise poses of ones of predetermined rehabilitation categories, including the predetermined rehabilitation category.

2. The method according to claim 1,
    wherein said scoring the motion feature of the at least one body part from the video data comprises determining an angle,
    wherein the angle comprises an angle between portions of the at least one body part of the person.

3. The method according to claim 2, further comprising:
    scaling the at least one body part of the person to a predetermined size based on a height of the person; and
    applying one or more Gaussian filters to the motion feature,
    wherein said scoring of the motion feature based on the predetermined rehabilitation category comprises said scoring after said scaling of the at least one body part of the person.

4. The method according to claim 3,
    wherein said scoring the motion feature of the at least one body part from the video data comprises determining a keypoint distance,
    wherein the keypoint distance comprises a Euclidean distance between a plurality of keypoints of the at least one body part of the person.

5. The method according to claim 1,
    wherein said generating the display illustrating the motion feature and said scoring of the motion feature comprises plotting the motion feature in the video data.

6. The method according to claim 1,
wherein said predicting the predetermined rehabilitation category by the DNN comprises ranking N*K pose regions, and
wherein K is an integer indicating a number of predetermined keypoints of a human body.

7. The method according to claim 1,
wherein said generating the display illustrating the motion feature and said scoring of the motion feature comprises generating the display such that at least one of the anchor poses is illustrated as overlayed on the at least one body part of the person.

8. The method according to claim 1,
wherein the video data of the at least one body part of the person comprises an red-green-blue (RGB) image of the at least one body part of the person obtained by the monocular camera.

9. An apparatus for video coding, the apparatus comprising:
at least one memory configured to store computer program code;
at least one processor configured to access the computer program code and operate as instructed by the computer program code, the computer program code including:
obtaining code configured to cause the at least one processor to obtain, from a monocular camera of a smartphone, video data including at least one body part of a person, the video data being spatially only two-dimensional;
selecting code configured to cause the at least one processor to select keypoints of the at least one body part based on a predetermined rehabilitation category;
extracting code configured to cause the at least one processor to extract a motion feature of the at least one body part from the video data;
scoring code configured to cause the at least one processor to score the motion feature based on the predetermined rehabilitation category; and
generating code configured to cause the at least one processor to generate a display illustrating the motion feature and said scoring of the motion feature,
wherein said selecting the keypoints of the at least one body part based on the predetermined rehabilitation category comprises predicting the predetermined rehabilitation category by a deep neural network (DNN) configured to predict N possible regions representing possible locations of the keypoints with respect to the at least one body part,
wherein N is an integer,
wherein said predicting the predetermined rehabilitation category by the DNN comprises comparing the video data including at least one body part of the person to a plurality of anchor poses, and
wherein the plurality of anchor poses each comprise poses of ones of predetermined rehabilitation categories, including the predetermined rehabilitation category.

10. The apparatus according to claim 9,
wherein said scoring the motion feature of the at least one body part from the video data comprises determining at least one of a keypoint distance and an angle,
wherein the keypoint distance comprises a Euclidean distance between a plurality of keypoints of the at least one body part of the person, and
wherein the angle comprises an angle between portions of the at least one body part of the person.

11. The apparatus according to claim 10,
wherein the computer code further includes scaling code configured to cause the at least one processor to scale the at least one body part of the person to a predetermined size based on a height of the person, and
wherein said scoring of the motion feature based on the predetermined rehabilitation category comprises said scoring after said scaling of the at least one body part of the person.

12. The apparatus according to claim 11,
wherein the computer code further includes application code configured to cause the at least one processor to apply one or more Gaussian filters to the motion feature.

13. The apparatus according to claim 9,
wherein said generating the display illustrating the motion feature and said scoring of the motion feature comprises plotting the motion feature in the video data.

14. The apparatus according to claim 9,
wherein said predicting the predetermined rehabilitation category by the DNN comprises ranking N*K pose regions, and
wherein K is an integer indicating a number of predetermined keypoints of a human body.

15. The apparatus according to claim 9,
wherein said generating the display illustrating the motion feature and said scoring of the motion feature comprises generating the display such that at least one of the anchor poses is illustrated as overlayed on the at least one body part of the person.

16. A non-transitory computer readable medium storing a program causing a computer to execute a process, the process comprising:
obtaining, from a monocular camera of a smartphone, video data including at least one body part of a person, the video data being spatially only two-dimensional;
selecting keypoints of the at least one body part based on a predetermined rehabilitation category;
extracting a motion feature of the at least one body part from the video data;
scoring the motion feature based on the predetermined rehabilitation category; and
generating a display illustrating the motion feature and said scoring of the motion feature,
wherein said selecting the keypoints of the at least one body part based on the predetermined rehabilitation category comprises predicting the predetermined rehabilitation category by a deep neural network (DNN) configured to predict N possible regions representing possible locations of the keypoints with respect to the at least one body part,
wherein N is an integer,
wherein said predicting the predetermined rehabilitation category by the DNN comprises comparing the video data including at least one body part of the person to a plurality of anchor poses, and
wherein the plurality of anchor poses each comprise poses of ones of predetermined rehabilitation categories, including the predetermined rehabilitation category.

* * * * *